(No Model.) 4 Sheets—Sheet 4.

L. W. PUFFER.
APPARATUS FOR CARBONATING FLUIDS.

No. 522,673. Patented July 10, 1894.

Witnesses.
John F. Nelson.
E. R. Boynton.

Inventor.
Luther W. Puffer.
by H. L. Lodge Atty.

UNITED STATES PATENT OFFICE.

LUTHER W. PUFFER, OF MEDFORD, MASSACHUSETTS.

APPARATUS FOR CARBONATING FLUIDS.

SPECIFICATION forming part of Letters Patent No. 522,673, dated July 10, 1894.

Application filed April 21, 1894. Serial No. 508,416. (No model.)

*To all whom it may concern:*

Be it known that I, LUTHER W. PUFFER, a citizen of the United States, residing at Medford, in the county of Middlesex and State of Massachusetts, have invented certain new and useful Improvements in Apparatus for Carbonating Fluids; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to apparatus for carbonating liquids and consists in the arrangement of the several co-operating elements by which the entire process of carbonating is automatically performed.

My apparatus in brief is embodied in three reservoirs, two of which are stationary while the third is movable. Further in employing the stationary closed vessel or reservoir respectively for fluid and gas and moreover in arranging pumps which are to be operated or discontinued from use according to the conditions which prevail within the movable reservoir with respect to the quantity of liquid or the volume of gas contained therein. In other words my improved apparatus is intended to maintain the proper supply of liquid subjected to a certain gas pressure and in this way provide for a continuous supply of carbonated liquid to be drawn from the movable vessel or reservoir.

Further description of the various co-operating elements, their functions and corelation will be fully hereinafter described and set forth.

Figure 1:
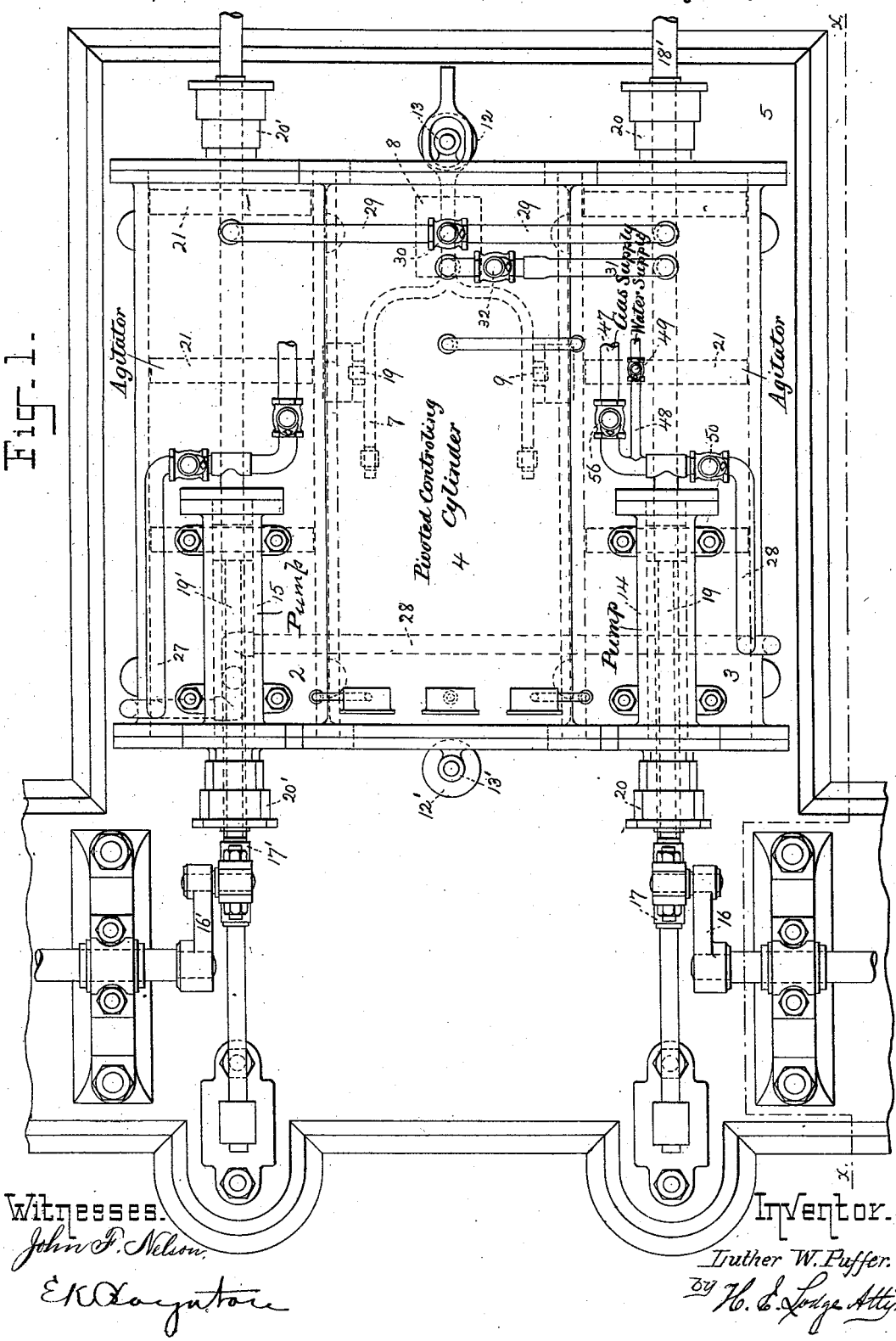
Figure 2:
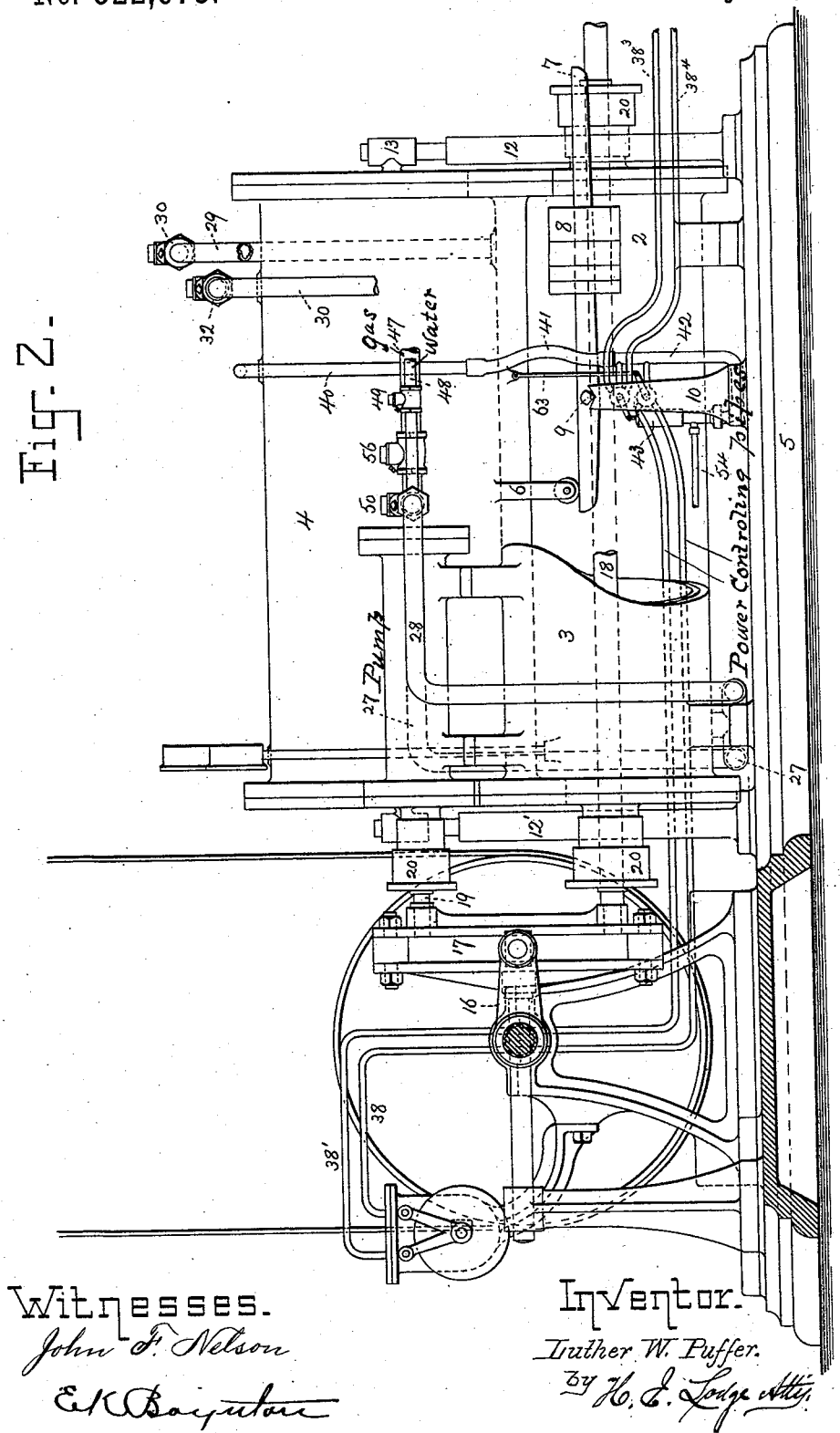
Figure 3:
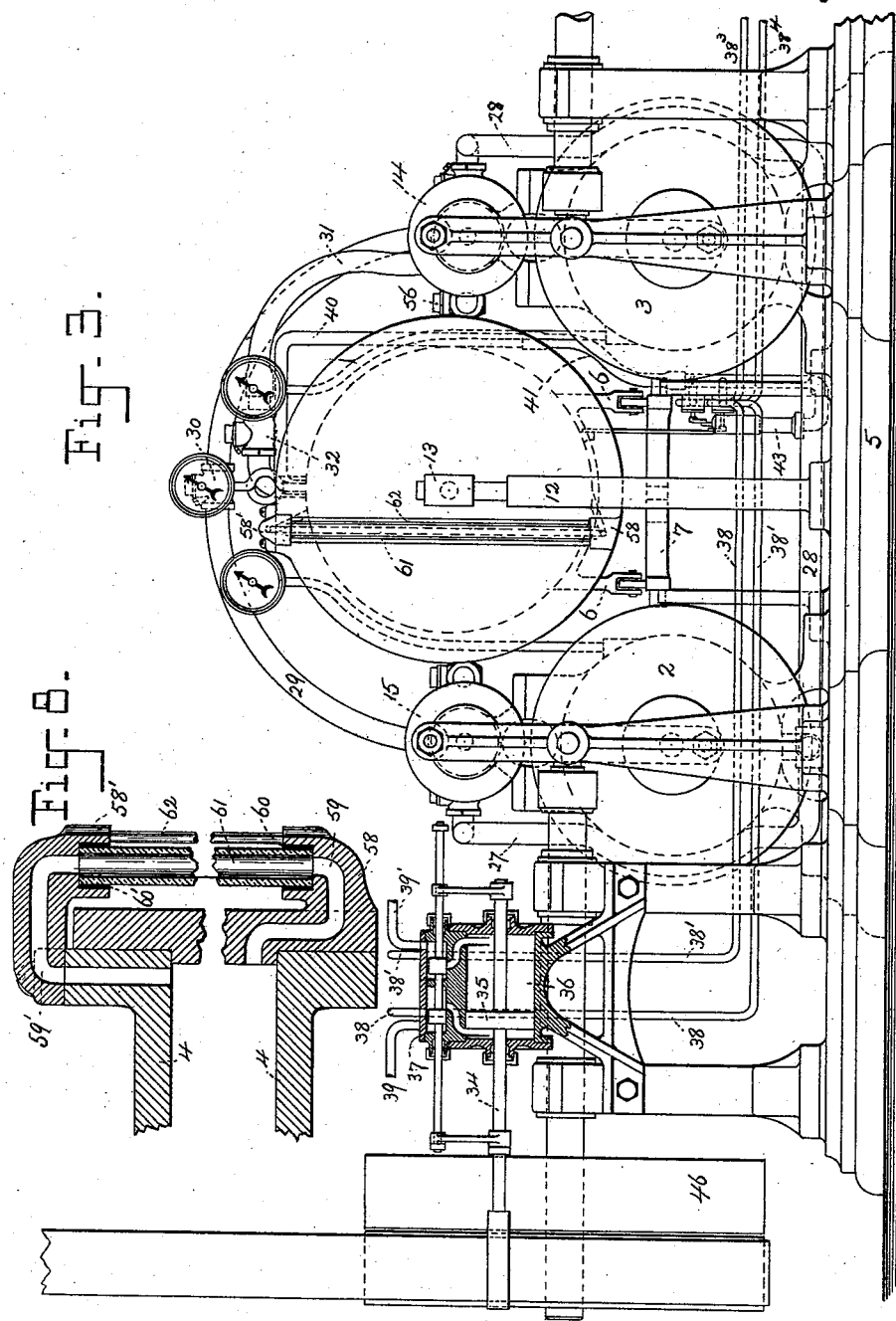
Figure 4:
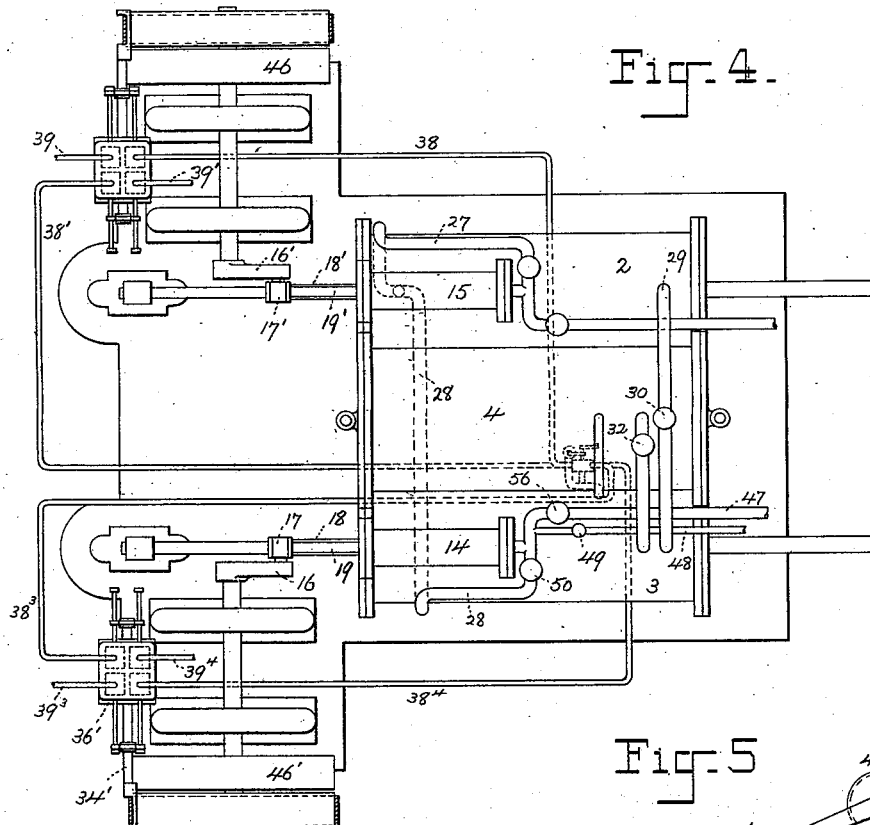
Figure 5:
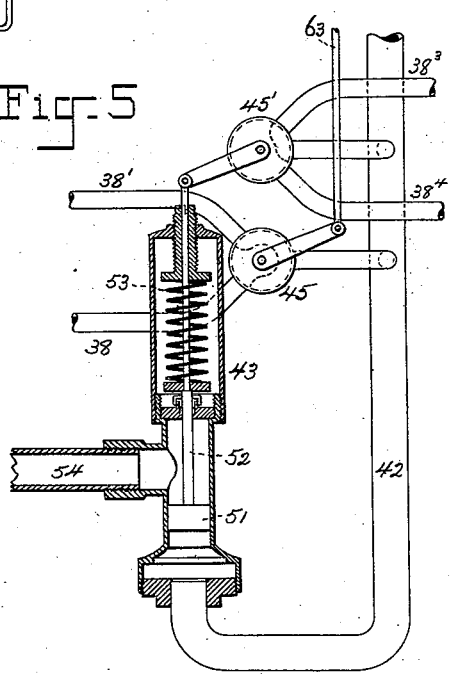
Figures 6, 7:
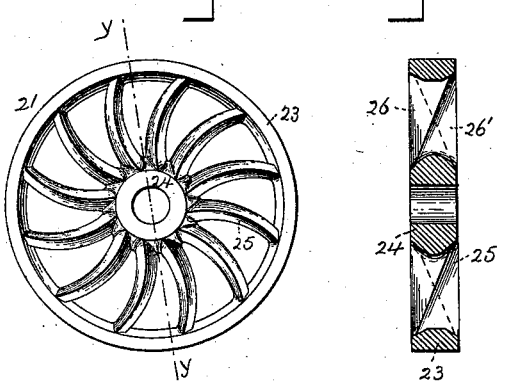

The drawings represent in Figure 1 a plan in part of apparatus for automatically carbonating fluids under my invention. Fig. 2 is a side elevation with one of the reservoirs removed in part. Fig. 3 is an end elevation with the belt controlling apparatus in section. Fig. 4 is a plan showing in detail the belt controlling apparatus. Fig. 5 is a sectional elevation enlarged of the two way valves which govern the belt controlling apparatus one to be operated for gas the other for fluid. Fig. 6 is a side elevation and Fig. 7 a vertical diametrical section on line $y\ y$ of a carbonating disk or agitator. Fig. 8 is a sectional elevation in part enlarged of the water gage showing its manner of attachment.

The primary features of my invention are embodied in three reservoirs or closed vessels, of which two are stationary, respectively 2 and 3 for fluids and gas. The third 4 which I term a receiver is adapted to rise and fall, its movement being regulated by the amount of its fluid contents. As shown in the drawings, the reservoirs 2 and 3 are affixed to the base of the frame 5 while the receiver 4 is mounted upon legs 6 which rest upon a U shaped lever 7 counterbalanced by adjustable weights 8. This lever has trunnions 9 which engage in uprights 10. To steady the receiver during its rise and fall posts 12 12' are placed at each end in alignment with the longitudinal central axis. The upper extremity is reduced in diameter to create a shoulder, while a sleeve 13 is to reciprocate on such reduced portion. Each reservoir is equipped with a pressure gage likewise a water glass, but one of which is shown; while the reservoirs 2 and 3 for convenience of construction have two pumps 14 for gas, 15 for fluids. These pumps are operated by twin crank shafts 16 16' from some prime motor; said crank shafts are united to a cross head 17 and 17' from which extend two rods 18, 19, 18' 19' respectively for the reservoirs 3—2 and their pumps. Stuffing glands 20 prevent the escape of gas or liquid. In order to cause the liquid to absorb a larger amount of gas than it would ordinarily do by natural absorption stirrers or agitators 21 are affixed upon the rods 18 18'.

The preferred form of agitator is shown in Figs. 6 and 7 and illustrates an annular rim 23 secured to a hub 24 by spokes or arms 25. These arms are curved and polygonal in cross section with corresponding surfaces 26 26' tapering from the rim to the hub, and conversely as shown. Hence the agitator works equally well in whichever direction it may travel and by passing through the liquid subdivides and separates it, at the same time producing a whirling or stirring effect at each reciprocation longitudinally of the reservoirs.

In the operation of this apparatus it is to be understood that the three reservoirs 2, 3, 4 are connected in series; the gas and fluid first passing from the pumps to the reservoir 2 by way of the pipes 27, 28 respectively, entering said reservoir 2 at the bottom; thence the gas and fluid pass through the pipe 29 which terminates in the upper portion of the reservoir 3. This pipe 29 is equipped with a pressure regulator or a reducing valve 30. Hence the pressure in said reservoir can be regulated, while the fluid is held back and prevented from escaping until a predetermined pressure has been reached. In this way a more thorough carbonating of the fluid is produced. This regulator may be of any approved construction. From the reservoir 3 the commingled fluid and gas, after being thoroughly agitated during the interval it remains therein, is allowed to pass into the receiver 4 by way of the pipe 31 likewise supplied with a reducing valve 32, which operates similarly and for the same purposes as the pressure regulator 30 before alluded to. This pipe 31 is flexibly connected with the receiver to allow free motion of the latter. From the receiver 4 the fluid, then supposed to be in a highly carbonated condition, may be drawn as circumstances require. One characteristic feature in this invention is to have the receiver automatically control the operation of the liquid and gas pump in order to provide a constant supply of carbonated liquid within the reservoirs 2, 3 which are designed to supply said receiver. To carry out this result I have arranged belt-operating mechanism for both pumps, as likewise for the agitator shafts; but since this mechanism is similar for both pumps I have shown only one of the latter under control of the belt-operating device. As illustrated in Fig. 3 a belt-shifting rod 34 is equipped with a piston 35 within a closed cylinder 36: the valve chest 37 being longitudinally and transversely divided, see Fig. 4; consequently each chest is united with a gas supply and discharge pipe. These pipes are indicated at 38, 38' which are supply; while 39. 39' are the discharge pipes respectively for the pipes 38. 38'. Hence, if gas is entering by pipe 38 it is discharging through 39': hence the piston moves intermittently; that is, if it is advanced to one end of the cylinder it will so remain until change in the position of the receiver 4 has shifted one of the valves to admit gas into the opposite end of the cylinder. These occasional reciprocations being intended to start or stop the fluid or gas pumps as circumstances may require. The gas pump is controlled by the pressure within the receiver, yet the excess or lack of fluid within the receiver produces no effect upon the gas pump. The pressure however may be made to serve to control the fluid pump likewise.

A pipe 40 extends from the receiver 4 and is flexibly united at 41 with a pipe 42 terminating in a spring actuated pressure valve 43, see Fig. 5; from the pipe 42 extend short pipes which enter two-way valves 45, 45'; from the latter come the pipes 38³. 38⁴, from the former the pipes 38. 38'; the several pipes 38. 38', 38³. 38⁴ interconnecting said pipe 42 with the belt-operating cylinder.

The receiver 4, as before premised, is adapted to rise and fall, such action being dependent upon the amount of its fluid contents, and these can be regulated by the position of the weights on the lever 7. Thus when the vessel has received a proper quantity which may fill or partly fill it, the receiver overcomes the leverage of the weights and falls until the guides 13 contact with the shoulders on the posts 12, which serve as stops. Coincident with the fall of the receiver the two-way valve 45 is shifted by means of a rod 63. But since this movement of the receiver 4 indicates that sufficient liquid is now contained therein the pump 15 for fluid supply is to be stopped. To accomplish this act the valve 45 is shifted to allow gas pressure through the pipe 38' to thrust the piston 35 to the opposite end of the cylinder from that shown in Fig. 3. This travel of the cylinder moves the belt upon the idle pulley 46 and the latter remains inactive until the contents of the receiver 4 have been exhausted or partially so, when the cylinder rises and again shifts the valve 45, to allow the gas pressure to return the piston 35 to the position as shown in Fig. 3, the gas passing through the pipe 38. The valves in the valve-chest are so arranged that a gas impulse due to the change in the position of the valve 45 will cause the piston to advance to one end of the cylinder and there remain, until a second impulse due to another shift of the valve 45 sends it to the opposite end. Hence it will be seen that the contents of the receiver are automatically maintained of the requisite amount, and the pump 15 is so governed, as likewise the movement of the agitators in the cylinder 2; hence the liquid in this cylinder is kept stirred up only when fresh liquid is entering and it is necessary to carbonate the same.

The above mechanism provides for a proper fluid supply to compensate for the discharge whatever it may be; but it is moreover necessary to regulate the proper pressure of the gas in the system. Now as the requisite volume of gas may not be under the proper pressure at the time the receiver acquired the desired quantity of fluid it is necessary to regulate and control the gas pump 14 in some other way than by the rise and fall of the receiver. To carry out my method it will be seen that I have provided a check-valve 56 in the gas supply pipe 47 to the pump 14, see Fig. 1; while a small water supply pipe 48 with a check-valve 49 co-operates therewith; hence a small amount of water always enters at each stroke and the balance is made up by a volume of gas. In this way the pump is not heated and its action is more regular and uniform than if gas alone was being pumped. A second check 50 in the feed pipe to the reservoir 2 serves to aid the pump and overcome back pressure.

To regulate the action of the pump 14 the pressure valve 43 before mentioned is employed, see Fig. 5; this is located at the extremity of the pipe 42 leading from the receiver 4. Said valve comprises a piston 51 and a rod 52 which projects beyond the closed tube and is united to the two-way valve 45'. A coiled spring 53 of such tension as will maintain the piston in the position shown in Fig. 5 serves to keep the pressure, normal as desired. Should the pressure become excessive for any reason whatsoever, the piston is forced upward with the result to shift the valve and allow gas to escape through the pipe 38³ and advance the piston 35' in the cylinder 36' in such direction as will cause the shifting rod 34' to throw the belt upon the loose pulley 46'. Should the pressure still continue to increase, the piston is raised until its lower surface is above the mouth of the safety pipe 54, when the gas is allowed to escape therethrough into the open air or preferably to pass back and be returned to the gasometer. The tension of spring may be adjusted to suit varying pressures as may be desired.

In operating the carbonating apparatus I find it of service to employ a water glass one of which is shown upon the receiver although similar ones may be affixed to the reservoirs 2. 3. For purposes of convenience they may be attached as shown in Fig. 8. Preferably upon the face of the flange of the head is cast a boss 58 having a duct 59 which connects with the interior of the receiver, while a socket 60 is formed to receive the lower end of the glass 61. To secure the upper end of the glass tube a removable boss 58' with a duct 59' engages the tube which enters a socket 60'. Wires 62 are employed as guards after the usual method adopted. Thus if the head is to be removed, the boss 58' is taken off and the glass then lifted out from the lower boss.

What I claim is—

1. A carbonating apparatus comprising a closed vessel adapted to rise and fall due to the amount of its fluid contents, two pumps respectively for gas and fluid connected therewith, mechanism for actuating said pumps, and means for disconnecting the driving mechanism from one or both pumps due to the excess of fluid contents or pressure within the closed vessel, substantially as and for purposes explained.

2. The combination with two or more closed vessels connected in series one of which is adapted to rise and fall, a pump for fluid supply, and mechanism for actuating said pump, of a piston and cylinder connected with the receiving vessel for controlling the pump actuating mechanism, and a device to move the piston due to excess or lack of fluid within the receiving vessel substantially as described.

3. In carbonating apparatus, the combination with a closed vessel, a pump thereabove, a cross-head, and means for reciprocating the same, of two rods adapted to move longitudinally within the closed vessel and the pump, the pump rod having an imperforate piston, the rod in the closed vessel carrying an open piston or agitator and means for causing both rods to move simultaneously, substantially as described.

4. In apparatus for charging fluid with carbonic acid gas the combination with a closed vessel, a gas-forcing device, as a pump, a piston-equipped cylinder, and mechanism to drive said pump and controlled by said cylinder, of a two-way valve, pipes from the closed vessel to said cylinder, a spring-equipped piston 51 adapted to move and thereby serve to stop or start the pump due to excess or lack of pressure, within the closed vessel, substantially as stated.

5. In carbonating apparatus a closed vessel adapted to rise or fall due to lack or excess of fluid contents, a fluid forcing pump, a piston-equipped cylinder to control mechanism which actuates the pump, combined with a two-way valve, pipes from said valve to the cylinder, a pipe from said valve to the closed vessel, and mechanism which interconnects the valve with the vessel whereby gas in the closed vessel serves to operate the piston in the cylinder to start or stop the pump, substantially as specified.

6. In carbonating apparatus, a closed vessel adapted to rise and fall due to lack or excess of fluid contents, two fixed standards, a bifurcated weighted lever mounted thereupon, pendent arms secured to the vessel and furnished with anti-friction rollers, which rest upon the opposite lever forks combined with posts located at the ends of the closed vessel, and sleeves adapted to slide upon the posts and which interconnect said posts with the vessels, as herein set forth and stated.

7. In carbonating apparatus, the combination with two or more closed vessels connected in series, regulators between said vessels whereby the contents are not allowed to pass from one to another except at given pressures, and independent pumps for supplying gas and fluid, of mechanism for actuating said pumps, mechanism for controlling said pump actuating mechanism, and devices connected with the closed vessels to the controlling mechanism, whereby excess or lack of either the fluid contents or the gas pressure will operate to stop or start the pumps, substantially as explained.

8. In combination with a closed receiver adapted to rise and fall due to lack or excess of its fluid contents, a second stationary closed reservoir connected therewith, a pump secured upon the stationary reservoir, a cross-head, and means for reciprocating the same, of two rods adapted to move longitudinally within the stationary reservoir and the pump, an imperforate piston on the pump rod, an open disk or agitator on the rod in the stationary reservoir, and mechanism for controlling the movements of the cross-head due to excess or lack of fluid contents in the receiver, substantially as described.

9. In carbonating apparatus, the combination with a stationary reservoir, and a rod longitudinally therein, of an imperforate disk or agitator affixed upon said rod and comprising an annular rim, a central hub, and arms which interconnect said rim and hub, said arms being polygonal in cross-section with corresponding surfaces oppositely disposed, tapering from the rim to the hub and conversely to allow the agitator to move in either direction, and mechanism exteriorly of the cylinder to cause reciprocations of the agitator substantially as specified.

In testimony whereof I affix my signature in presence of two witnesses.

LUTHER W. PUFFER.

Witnesses:
H. E. LODGE,
DAVID J. PUFFER.